C. W. KENNEDY, E. W. CARLSON & N. C. JEFFES.
CHEST EXPANSION MEASURING DEVICE.
APPLICATION FILED FEB. 23, 1909.

940,256. Patented Nov. 16, 1909.

Witnesses
Marguerite Van Der Volgen
Anna E. Hodgkins

Inventors
Charles W. Kennedy
Eric W. Carlson
Nickolaus C. Jeffes
by Walter E. Ward
Atty.

UNITED STATES PATENT OFFICE.

CHARLES W. KENNEDY, ERIC W. CARLSON, AND NICKOLAUS C. JEFFES, OF SCHENECTADY, NEW YORK.

CHEST-EXPANSION-MEASURING DEVICE.

940,256. Specification of Letters Patent. Patented Nov. 16, 1909.

Application filed February 23, 1909. Serial No. 479,602.

*To all whom it may concern:*

Be it known that we, CHARLES W. KENNEDY, ERIC W. CARLSON, and NICKOLAUS C. JEFFES, citizens of the United States, residing at Schenectady, in the county of Schenectady and State of New York, have invented certain new and useful Improvements in Chest-Expansion-Measuring Devices, of which the following is a specification.

Figure 1:
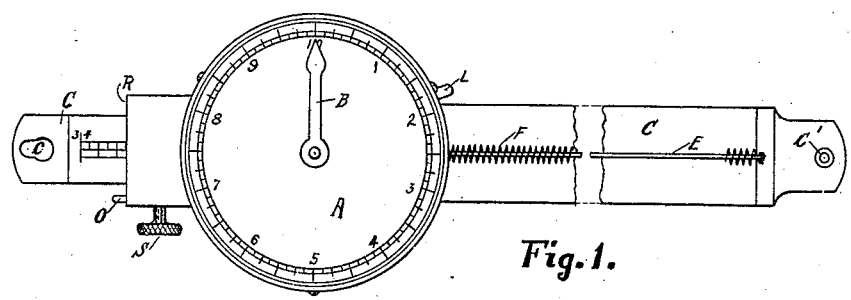
Figure 2:
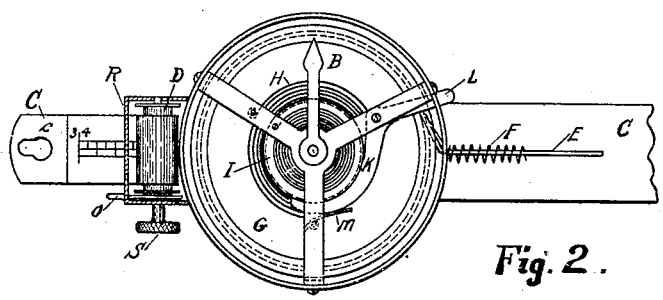
Figure 3:
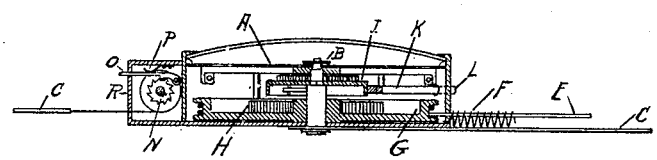

Our invention relates to measuring devices and the object of our invention is to construct a device for measuring the chest and chest expansion accurately whereby the amount of the expansion may be readily and accurately measured and automatically registered. We accomplish this result by means of mechanism illustrated in the accompanying drawings, in which, Figure 1 is a front elevation of our measuring device, with the face of the dial showing the hand for automatically registering the measurements in position. Fig. 2 is a front elevation with the face of the dial removed showing the interior mechanism of the device. Fig. 3 is a vertical section of the same.

Similar letters refer to similar parts throughout the several views.

A is the face of the dial like the face of a watch upon which are numbers as for instance, 1 to 10, for the purpose of denoting the number of inches and fractions of an inch of the expansion of the chest being measured.

B is the hand appearing upon the face of the dial and arranged to revolve as hereinafter described.

C is a belt designed to pass around the chest of a person. One portion of the belt C has a graduated measuring scale in inches and fractions of inches corresponding with the divisions upon the face of the dial A. The graduated portion of the belt C is attached at one end to the frame of the dial by the frame holding the drum D and the other end of the plain portion of the belt C is elastic and is attached to the dial by any suitable means. The two loose ends of the belt C are adapted to be attached together by the button or clasp $c'$; attached to one end fitting in the socket $c$ at the other end so that the belt C could be attached around the chest of a person leaving the dial A in front of the chest. The graduated portion of the belt C is arranged to be wound up on the drum D and the numbers commencing at any desired number which would be equal to or slightly less than the measurement of a small person's chest as commencing at 34 and running upward to any desired number. The numbers and the belt are so arranged and adjusted that when the belt is placed upon a person's chest the normal measurement will be indicated by the reading of the graduated scale of the belt where it reaches the bar R of the frame holding the drum D. The other portion of the belt C is made of some elastic material and has in the center a wire E preferably incased in the coil spring F. The wire E extends around the pulley G in the casing of the dial A and is flexible and the other end is attached to a non-elastic part of the belt C near the fastening $c'$. The circumference of the pulley G is preferably the same as the graduated portion of the dial A.

H is a spring like a watch spring attached to the hub I of the pulley G. Mounted upon the hub I of the pulley G is the hand or indicator B.

K is the brake pivoted at some substantial part and arranged to operate upon the hub I or some portion of the pulley G and has a lever L which may be operated by the hand of the user.

M is a spring which is designed to hold the brake K against the hub I so as to hold the hub I and the pulley G stationary in any position where left and pressing upon the lever L releases the hub so that the spring H will force it back in position.

Attached to the drum D is a ratchet N. The dog O is arranged to operate upon the ratchet N and the spring P arranged to hold the dog O upon the ratchet N. The free end of the dog O extends far enough to allow the user to raise the dog and to release the ratchet.

The operation of my measuring device is as follows: The belt C carrying the dial A is fastened around the chest of a person by the fasteners c' and c. The graduated portion of the belt C is then adjusted by the thumb piece S until the belt just fits and the hand or pointer B is at zero on the dial. This will give the normal measurement of the chest without expansion. Then when the chest expands the elastic portion of the belt C will stretch thereby drawing out the wire E which as it unwinds from the pulley G will turn the pulley G and the hub I which carries with it the pointer B and when the chest is expanded to the full extent the pointer B will indicate the number of inches of the expansion and the brake K will hold the pulley G and the hub I and also the pointer B stationary so that when the air from the chest has been expelled the pointer will still indicate the exact expansion. By moving the lever L the brake of the hub is released and the spring moves the pulley back to place and the pointer will again point to zero.

As above described the circumference of the pulley G is the same as the graduated circle upon the dial A and drawing out the wire E one inch will move the pointer or hand B so as to indicate one inch upon the dial, but it is evident that the hub I can be so geared that the circumference of the dial may be made half or one quarter the size of any multiple thereof so that an accurate measurement could be obtained with a smaller circumference of the dial.

Constructed in this manner our device may be quickly and readily used by physicians or life insurance examiners or by other persons desiring to make quick and accurate measurements or by the individuals themselves and the dial may be graduated in small fractions of an inch as may be desired and the graduated portion of the belt C may be adjusted to commence at any number of inches desired and graduated to correspond with the graduation upon the dial as may be desired.

What we claim as our invention and desire to secure by Letters Patent is,

1. A chest-measuring device consisting of a graduated belt attached to a dial one portion of said belt being elastic, and one portion thereof non-elastic, a pointer on the face of said dial, said pointer mounted upon a hub within said dial, a non-elastic connection between said hub and the non-elastic portion of said belt whereby the expansion of the elastic portion of said belt will cause said non-elastic connection to move the pointer on the face of the dial a distance equal to the expansion of the belt.

2. In a chest-expansion measuring device, a belt consisting of two sections, one section of non-elastic graduated material, the other section consisting of elastic material, one end of each section attached to a dial, the free ends of said sections adapted to be attached together around the person's chest, a dial, a pointer on the face of the dial, a pulley in the rear of said dial having a hub extending to the face of the dial upon which said pointer is adapted to be mounted, a non-elastic material attached to said pulley at one end and extending along the elastic portion of the belt and attached to the non-elastic portion at the other end, whereby the expansion of the chest expanding the elastic portion of said belt will be indicated by said pointer upon the face of said dial.

3. In a chest measuring device a dial, a drum attached to one side of said dial, a non-elastic graduated belt adapted to be rolled upon said drum, an elastic belt attached to the other side of said dial, means for attaching the ends of said belts together, a pointer on the face of said dial, a pulley in the rear of said dial, a hub to said pulley, said hub being adapted to operate said pointer, a spring attached to said hub and adapted to return said pointer to normal position, a non-elastic material extending along the elastic belt and connected with the non-elastic belt at one end and with said pulley on the other, substantially as described for the purposes set forth.

4. In a chest-expansion measuring device a dial, a belt consisting of two sections, one section being non elastic and having a graduated scale thereon and attached to one side of said dial, the other section of said dial being elastic and attached to the other side of said dial, means for attaching the free ends of said belt together around the person's chest, whereby the normal measurements of the chest will be indicated upon the graduated scale upon said belt, a pulley in the rear of said dial, a hub upon which said pulley is mounted, a pointer adapted to be operated by said hub, a brake adapted to operate upon said hub, a spring adapted to hold the brake upon said hub, a lever whereby the brake may be released from said hub, a spring adapted to return said hub carrying said pointer to normal position when released from said brake, a non-elastic connection extending along the elastic portion of said belt between said pulley and the non-elastic portion of said belt whereby the expansion of the chest will be indicated by said pointer upon the face of the dial, substantially as described for the purposes set forth.

5. A chest-expansion measuring device consisting of a dial, a pointer on the face of the dial, a pulley in the rear of said dial, a hub upon which said pulley is mounted, means for mounting said pointer upon said hub, a brake adapted to operate upon said hub, a spring adapted to hold the brake upon said hub, a lever adapted to release the brake from said hub, a spring adapted to return said hub carrying said pointer to normal position when released from said brake, a belt adapted to pass around a person's chest, one end being attached to said dial and the other end to said pulley substantially as described for the purposes set forth.

In testimony whereof we affix our signatures in presence of two witnesses.

CHAS. W. KENNEDY.
ERIC W. CARLSON.
NICKOLAUS C. JEFFES.

Witnesses:
ELISABETH L. STYRING,
ANNA E. HODGKIN.